(12) United States Patent
Hollenstein (10) Patent No.: US 8,935,121 B2
(45) Date of Patent: Jan. 13, 2015

(54) METHOD FOR TRACKING THE POSITION AND THE HEADING OF A VEHICLE USING DEAD RECKONING AND A TRACKING DEVICE FOR CARRYING OUT THE METHOD

(75) Inventor: Christine Hollenstein, Bichwil (CH)

(73) Assignee: u-blox AG, Thalwil (CH)

( * ) Notice: Subject to any disclaimer, the term of this patent is extended or adjusted under 35 U.S.C. 154(b) by 610 days.

(21) Appl. No.: 12/964,447

(22) Filed: Dec. 9, 2010

(65) Prior Publication Data

US 2012/0116712 A1    May 10, 2012

(30) Foreign Application Priority Data

Nov. 4, 2010 (EP) .................................. 10405212

(51) Int. Cl.
  *G06F 15/00* (2006.01)
  *G01C 22/02* (2006.01)
  *G01C 21/28* (2006.01)

(52) U.S. Cl.
  CPC .............. *G01C 22/025* (2013.01); *G01C 21/28* (2013.01)
  USPC .............................. 702/150; 701/41; 701/216

(58) Field of Classification Search
  CPC ........................................................ G06F 3/011
  USPC .......................................................... 702/150
  See application file for complete search history.

(56) References Cited

U.S. PATENT DOCUMENTS

| 5,477,220 | A | 12/1995 | Ishikawa et al. | |
| 7,444,222 | B2 * | 10/2008 | Villella et al. | 701/70 |
| 2007/0050112 | A1 * | 3/2007 | Kroehnert et al. | 701/41 |
| 2007/0083308 | A1 * | 4/2007 | Hara | 701/41 |
| 2008/0294342 | A1 * | 11/2008 | Hoshizaki et al. | 701/216 |

FOREIGN PATENT DOCUMENTS

| EP | 0360934 | 4/1990 |
| WO | WO8401823 | 3/1984 |

OTHER PUBLICATIONS

European Search Report for EP Application No. 10405212.1 dated Apr. 28, 2011.

(Continued)

*Primary Examiner* — Patrick Assouad
*Assistant Examiner* — Haidong Zhang (57) ABSTRACT

Position ($x_{ref}$) and heading (H) of a vehicle are tracked using wheel tick numbers coming from wheel tick units at the front wheels only from which a velocity (v) and a heading rate (h) are calculated. The calculations are based on an intermediate wheel angle ($\delta$). An exact solution $\delta_{ex}$ for the same depends on the velocities of the left front wheel $v_l$ and the right front wheel $v_r$. An approximate solution $\delta_{app}$ is calculated according to a simpler formula and used wherever its deviation from the exact solution $\delta_{ex}$ is not significant, i.e., where the latter is not larger than a threshold wheel angle $\delta_{thr}$. Only for $\delta_{app} > \delta_{thr}$ where the deviation is larger than a threshold, the wheel angle according to the exact solution $\delta_{ex}$ is used. The latter is determined by first establishing the approximate solution $\delta_{app}$ and reading the corresponding exact solution $\delta_{ex}$ from a look-up table.

19 Claims, 5 Drawing Sheets

(56) References Cited

OTHER PUBLICATIONS

Ch.Hollenstein, E.Favey, C.Schmid, A.Somieski, D.Ammann: "Performance of a Low-cost Real-time NaVigation System using Single-frequency GNSS Measurements Combined with Wheel-tick Data", Proceedings of the 21st International Technical Meeting of the Satellite Division of the Institute of Navigation (ION GNSS 2008), Sep. 16-19, 2008, pp. 1610-1618, Savannah, GA.

* cited by examiner

METHOD FOR TRACKING THE POSITION AND THE HEADING OF A VEHICLE USING DEAD RECKONING AND A TRACKING DEVICE FOR CARRYING OUT THE METHOD

RELATED APPLICATION

This application claims the benefit of priority under 35 USC §119 to EP Patent Application No. 10405212.1 filed on Nov. 4, 2010, the entire contents of which are incorporated herein by reference.

FIELD OF THE INVENTION

The invention concerns a method for keeping track of the position and the heading of a vehicle using tracking by dead reckoning. Such methods are used in cars and other vehicles, often complementing determination of the vehicle position by Global Navigation Satellite System (GNSS), in particular, where GNSS signals are temporarily too weak or unavailable, e.g., in tunnels, car parkings and the like. The invention also concerns a tracking device for carrying out the method.

PRIOR ART

Methods for tracking the position and heading of a vehicle by dead reckoning using rear wheel velocities derived from sensor measurements are well known. Although the evaluation of front wheel velocities is more complicated due to the variability of the wheel angles methods using only front wheel velocities have also been proposed. So far only approximate solutions connecting the velocity and heading rate of the vehicle to left and right front wheel velocities have been employed, see, e.g.: Ch. Hollenstein, E. Favey, C. Schmid, A. Somieski, D. Ammann: 'Performance of a Low-cost Real-time Navigation System using Single-frequency GNSS Measurements Combined with Wheel-tick Data', Proceedings of ION GNSS 2008 Meeting, Savannah, September 2008, the contents of which are incorporated herein in their entirety. According to this paper, the wheel angle was determined by iterative methods. The approximations used can compromise the precision of the tracking where large wheel angles cannot be excluded.

SUMMARY OF THE INVENTION

It is the object of the invention to provide a method for keeping track of the position and heading of a vehicle which provides improved precision.

The advantages of the method according to the invention are particularly pronounced where large wheel angles occur, e.g., in underground car parkings and similar environments where, at the same time, GNSS signals tend to be weak or absent. The method can be implemented in ways which are very economical as to processing power and memory requirements.

The sensor measurements can be used in combination with GNSS measurements where such are available, e.g., by feeding both to a tightly coupled Kalman filter.

It is another object of the invention to provide a tracking device suitable for carrying out the method according to the invention.

BRIEF DESCRIPTION OF THE DRAWINGS

In the following the invention is described in more detail with reference to drawings which only illustrate an examplary embodiment.

DESCRIPTION OF THE PREFERRED EMBODIMENTS

In vehicles so-called 'dead reckoning' is often used for tracking the position of the vehicle by determining the velocities of the wheels and using the results as a basis for updating the vehicle position, either in combination with GNSS or, where GNSS is not available, by itself. Dead reckoning and GNSS tracking calculations can be carried out in an appropriate tracking device, usually a component of the vehicle or attached to the same, and the results displayed or made use of in other ways.

A wheel velocity is normally determined from sensor measurements, usually signals known as 'wheel ticks' which are produced at particular rotational positions separated by fixed angular increments. Where sensor measurements from the rear wheels are used, deriving the speed and heading rate of the vehicle is usually straightforward as wheel angles may be assumed to be constant and equal to zero.

In some cases, however, sensor measurements from rear wheels are not available and speed and heading rate are derived from front wheel sensor measurements alone. This includes more involved calculations as the variable wheel angles which are taken into account is derived from the wheel ticks as well unless they are available otherwise, e.g., from direct measurements.

Figure 1:
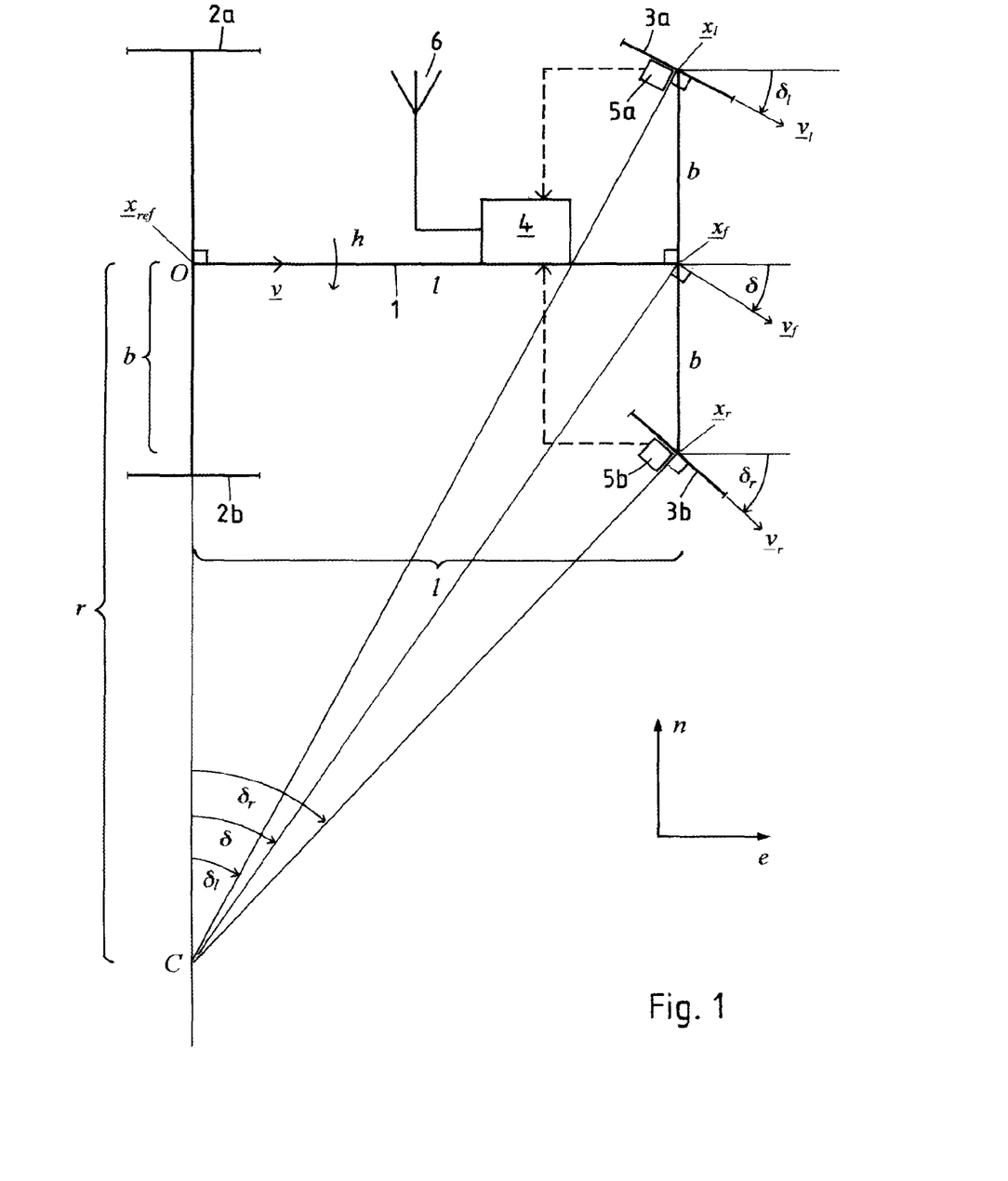
FIG. 1 schematically shows a vehicle comprising a tracking device according to the invention and whose position and heading is being tracked using the method according to the invention.
Figure 5:
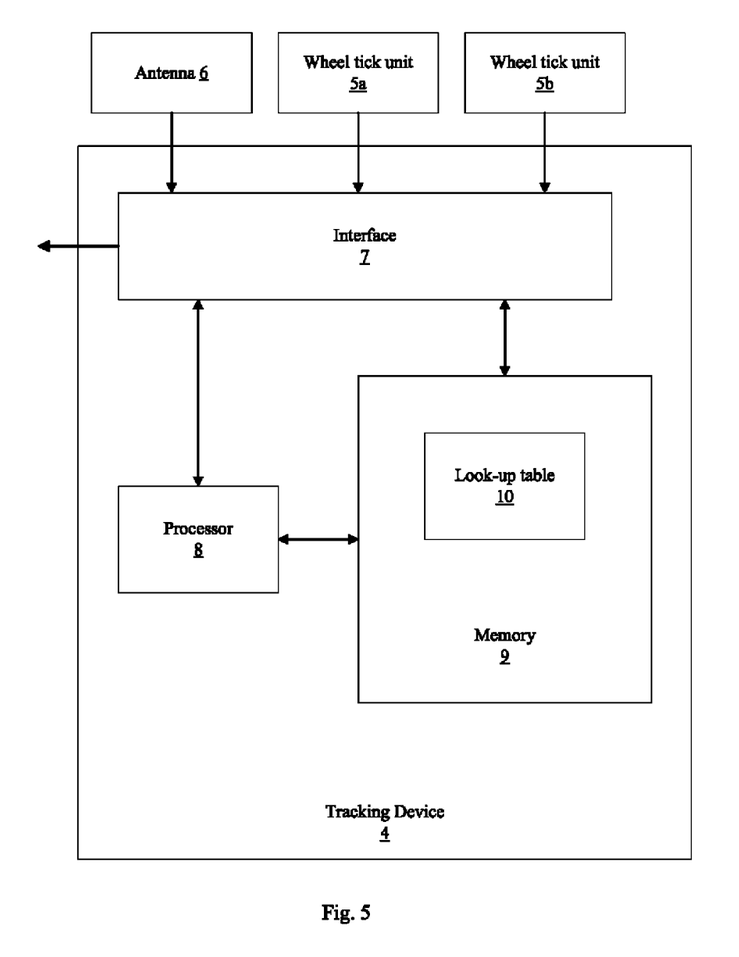
FIG. 5 shows a block diagram of one embodiment of the tracking device of FIG. 1.

In the following the case where wheel angles are derived solely from front wheel sensor measurements is described in detail. It is assumed that the vehicle (FIG. 1) comprises a rigid frame 1 on which rear wheels 2a,b and front wheels 3a,b are mounted. The vehicle is steerable in that the front wheels 3a,b are rotatable about vertical axes passing through their centers and may assume wheel angles covering an interval containing 0° which value corresponds to a motion of the vehicle straight ahead. A tracking installation comprises a tracking device 4 which is fixed to the frame 1 and wheel tick units 5a,b monitoring the rotations of the front wheels 3a;b or other sensors producing sensor measurements from which the wheel velocities of the front wheels 3a,b can be derived. One embodiment of the tracking device 4 is shown in FIG. 5. A GNSS antenna 6 which is also mounted on the frame 1, feeds, like the wheel tick units 5a,b, data to the tracking device 4. The tracking device 4 is configured to process the sensor measurements, i.e., signals from the wheel tick units 5a,b, in order to extract a position and a heading of the vehicle from them as well as GNSS signals received by the GNSS antenna 6 and contains the components for storing and processing data and outputting results etc. which are used for the purpose. It is assumed that the frame 1 and the suspensions of the rear wheels 2a,b and the front wheels 3a,b are symmetrical with respect to an axis of symmetry which passes through the midpoints between the rear wheels 2a,b and the front wheels 3a,b.

In the following derivations it is assumed that there is no slippage and that the momentary motion of the wheel center follows in each case the direction implied by the wheel angle and, for simplicity, that the vehicle moves in a level plane defined by a northerly direction (n) and an easterly direction (e). Every vector $\underline{x}$ in the plane therefore consists of a northerly component and an easterly component, that is, $\underline{x}=(x^{(n)}, x^{(e)})$. If the plane the vehicle moves on is inclined it is straightforward to project its motion onto a level plane.

In the example the state of the vehicle can be described by the position of a reference point $\underline{x}_{ref}=(x_{ref}^{(n)}, x_{ref}^{(e)})$ fixed on the frame 1 of the vehicle and the heading H, i.e., the angle between the northerly direction and the longitudinal direction of the said frame, where the angle is measured clockwise.

In dead reckoning tracking of the vehicle position, a new state assumed by the vehicle at the end of a $(k+1)^{th}$ time update interval of length $\Delta t$ can be derived from the state at the end of the previous time update interval using equations of motion $$x_{ref,k+1}^{(n)} = x_{ref,k}^{(n)} + v\cos\left(H_k + \frac{h\Delta t}{2}\right)\Delta t \tag{1}$$

$$x_{ref,k+1}^{(e)} = x_{ref,k}^{(e)} + v\sin\left(H_k + \frac{h\Delta t}{2}\right)\Delta t \tag{2}$$

$$H_{k+1} = H_k + h\Delta t \tag{3}$$

where v is the momentary scalar velocity and h the momentary heading rate, i.e., the angular velocity of the vehicle. For every time update step the scalar velocity v and the heading rate h is therefore determined from the velocities $v_l$ and $v_r$ of the left and right front wheels. They correspond to raw velocities $T_l$, $T_r$ derived from numbers of wheel ticks registered during the time interval $\Delta t$ according to $$v_l = f_l T_l \tag{4a}$$

$$v_r = f_r T_r \tag{4b}$$

with wheel tick calibration factors $f_l$ and $f_r$ which depend on the wheel radii.

For simplicity it is (FIG. 1) assumed in the following that the vehicle is at the moment oriented in an easterly direction, i.e., that its heading H equals 90°, and that the reference point $\underline{x}_{ref}$ of the vehicle, defined as the midpoint between the centers of the rear wheels, is at the origin O. Thereby the below derivations can be carried out in a simple manner in the fixed coordinate system described above. As the results do not depend on the orientation of the vehicle and its position on the plane this does not imply a loss of generality.

According to the above assumptions, $$\underline{x}_{ref}=(0,0) \tag{5}$$

and the midpoint between the centers of the front wheels is at $$\underline{x}_f=(0,l) \tag{6}$$

where l is the wheel base of the vehicle and the centers of the front wheels are at $$\underline{x}_l=(b,l) \tag{7a}$$

$$\underline{x}_r=(-b,l) \tag{7b}$$

with b equalling one half of the front track gauge.

The vehicle, that is, its reference point $\underline{x}_{ref}$, moves at the moment with a velocity v in an easterly direction:

$$\underline{v}=(0,v). \tag{8}$$

The corresponding velocities of the other relevant points $\underline{x}_f$, $\underline{x}_l$, $\underline{x}_r$ are $$\underline{v}_f=(-v_f\sin\delta, v_f\cos\delta) \tag{9}$$

and $$\underline{v}_l=(-v_l\sin\delta_l, v_l\cos\delta_l) \tag{10a}$$

$$\underline{v}_r=(-v_r\sin\delta_r, v_r\cos\delta_r) \tag{10b}$$

where $v_f$, $v_l$ and $v_r$ each designate a scalar velocity, i.e., the length of the respective vector and $\delta_l$, $\delta_r$ are the wheel angles of the left and the right front wheel, respectively, whereas an intermediate wheel angle $\delta$ is the angle between the easterly direction and the momentary direction of motion of $\underline{x}_f$.

Defining $$a = \frac{b}{l}, \tag{11}$$

with $$\tan\delta = \frac{l}{r} \tag{12}$$

where r is the distance between $\underline{x}_{ref}$ and the momentary center of rotation of the vehicle C at $(-r,0)$ and $$\tan\delta_l = \frac{l}{r+b}$$

one gets $$\frac{1}{\tan\delta_l} = \frac{1+a\tan\delta}{\tan\delta}$$

and finally $$\tan\delta_l = \frac{\tan\delta}{1+a\tan\delta}. \tag{13a}$$

Similarly, from $$\tan\delta_r = \frac{l}{r-b}$$

one has $$\tan\delta_r = \frac{\tan\delta}{1-a\tan\delta}. \tag{13b}$$

From the rigidity of the vehicle it follows that $$\frac{d}{dt}\|x_f - x_{ref}\|^2 = 2\langle x_f - x_{ref}, \underline{v}_f - \underline{v}\rangle = 0 \tag{14}$$

and together with (5), (6), (8) and (9) that $l(v_f \cos \delta - v) = 0$ and $$v_f = \frac{v}{\cos \delta} \quad (15)$$

and finally with (9)

$$\underline{v}_f = (-v \tan \delta, v). \quad (16)$$

Using the same method for $\underline{x}_l$, $\underline{x}_r$ yields $$v_l = \frac{v}{\cos \delta_l (1 - a \tan \delta_l)} \quad (17a)$$

$$v_r = \frac{v}{\cos \delta_r (1 + a \tan \delta_r)} \quad (17b)$$

and $$\underline{v}_l = \frac{v}{1 - a \tan \delta_l}(-\tan \delta_l, 1) \quad (18a)$$

$$\underline{v}_r = \frac{v}{1 + a \tan \delta_r}(-\tan \delta_r, 1) \quad (18b)$$

and with (13a) and (13b), respectively, because of $$\frac{1}{1 - a \tan \delta_l} = \frac{1}{1 - \frac{a \tan \delta}{1 + a \tan \delta}}$$

$$= 1 + a \tan \delta \text{ and} \frac{1}{1 + a \tan \delta_r}$$

$$= \frac{1}{1 + \frac{a \tan \delta}{1 - a \tan \delta}}$$

$$= 1 - a \tan \delta$$

$$\underline{v}_l = v(-\tan \delta, 1 + a \tan \delta) \quad (19a)$$

$$\underline{v}_r = v(-\tan \delta, 1 - a \tan \delta) \quad (19b)$$

and $$v_l = v\sqrt{1 + 2a \tan \delta + (1 + a^2) \tan^2 \delta} \quad (20a)$$

$$v_r = v\sqrt{1 - 2a \tan \delta + (1 + a^2) \tan^2 \delta}. \quad (20b)$$

The scalar heading rate is $$|h| = \frac{\|(v_f - v)_\perp\|}{l} = \frac{|v_f^{(n)} - v^{(n)}|}{l} \quad (21)$$

where the subscript $\perp$ signifies the component of the vector which is perpendicular to the longitudinal axis of the vehicle, which leads to $$h = \frac{v \tan \delta}{l} \quad (22)$$

where it is assumed that a heading rate in the clockwise direction carries the plus sign.
Defining $V_+$ and $V_-$ as $$V_+ = v_l^2 + v_r^2 \quad (23)$$

and $$V_- = v_l^2 - v_r^2 \quad (24)$$

one gets from (20a) and (20b)

$$V_+ = 2v^2[1 + (1 + a^2)\tan^2 \delta] \quad (25)$$

and $$V_- = 4av^2 \tan \delta \quad (26)$$

or $$\tan \delta = \frac{V_-}{4av^2} \quad (27)$$

and $$V_+ = 2v^2 \left[1 + (1 + a^2)\frac{V_-^2}{16a^2 v^4}\right] = 2v^2 + (1 + a^2)\frac{V_-^2}{8a^2 v^2}$$

and finally $$v^4 - \frac{V_+}{2}v^2 + \frac{(1 + a^2)V_-^2}{16a^2} = 0. \quad (28)$$

This quadratic equation for $v^2$ has a solution $$v^2 = \frac{1}{4}\left(V_+ \pm \sqrt{V_+^2 - \frac{1 + a^2}{a^2}V_-^2}\right) \quad (29)$$

with two branches, one with a plus-sign and one with a minus sign in front of the square root.
With $$P = \frac{V_-}{V_+} \quad (30)$$

(29) becomes $$v^2 = \frac{V_+}{4}\left(1 \pm \sqrt{1 - P^2 - \left(\frac{P}{a}\right)^2}\right) \quad (31)$$

and for v one gets accordingly $$v = \pm \frac{1}{2}\sqrt{V_+\left(1 \pm \sqrt{1 - P^2 - \left(\frac{P}{a}\right)^2}\right)}, \quad (32)$$

where positive v signifies forward motion and negative v backward motion of the vehicle. (27) and (31) lead, together with (30), to exact solutions of equations (20a), (20b) for the tangent of the wheel angle $\delta$ and the said wheel angle itself:

$$\tan\delta_{ex} = \frac{\frac{P}{a}}{1 \pm \sqrt{1 - P^2 - \left(\frac{P}{a}\right)^2}}, \quad (33)$$

$$\delta_{ex} = \arctan\left(\frac{\frac{P}{a}}{1 \pm \sqrt{1 - P^2 - \left(\frac{P}{a}\right)^2}}\right). \quad (34)$$

(33) can be inverted and P represented as a function of $y=\tan\delta_{ex}$:

$$P(y) = \frac{2ay}{1 + (1 + a^2)y^2}. \quad (35)$$

This antisymmetric function has extrema at $$y_{max} = \frac{1}{\sqrt{1+a^2}}, \quad (36a)$$

$$y_{min} = -\frac{1}{\sqrt{1+a^2}} \quad (36b)$$

where $$P_{max} = P(y_{max}) = \frac{a}{\sqrt{1+a^2}}, \quad (37a)$$

$$P_{min} = P(y_{min}) = -\frac{a}{\sqrt{1+a^2}}. \quad (37b)$$

These are the values of P where the argument of the square root in (31) is zero and $\delta_{ex}$ assumes the values $$\delta_{ex}(P_{max}) = \arctan\left(\frac{1}{\sqrt{1+a^2}}\right), \quad (38a)$$

$$\delta_{ex}(P_{min}) = -\arctan\left(\frac{1}{\sqrt{1+a^2}}\right). \quad (38b)$$

The branch of the solution (31) which corresponds to a range for $\delta_{ex}$ containing 0—motion of the vehicle straight ahead—is the first branch where the square root in (31) and consequently in (33), (34) is preceded by a plus sign and which applies for $0 \leq |\delta_{ex}| \leq \delta_{lim}$ with $\delta_{lim} = \delta_{ex}(P_{max})$ whereas the second branch, with a minus sign in front of the square root, covers $\delta_{lim} \leq |\delta_{ex}| \leq 90°$. This implies that if $|\delta_{ex}|$ may assume values larger than $\delta_{lim}$ the solution is not everywhere unique as there are subranges of $\delta_{ex}$ surrounding $\delta_{lim}$ and $-\delta_{lim}$ where two solutions exist and it is not possible to pick the correct one on the basis of the momentary wheel velocities alone. However, for $\delta_{ex}=\delta_{lim}$ we have, by (13b), $$\delta_r = \delta_{wlim} = \arctan\left(\frac{1}{\sqrt{1+a^2} - a}\right) \quad (39)$$

and as long as the wheel angle of the right front wheel $\delta_r$ is, e.g., by mechanical constraints, limited by $\delta_r \leq \delta_{wlim}$—and, by symmetry—the wheel angle of the left front wheel $\delta_l$ by $\delta_l \geq -\delta_{wlim}$—the solution is unique as only the first branch in (31) and (33), (34) can apply. As $\delta_{wlim}$ is always larger than 45° and with most vehicles the wheel angles are limited to values smaller than that the limitation $0 \leq |\delta_{ex}| \leq \delta_{lim}$ will be assumed to hold in the following.

With this assumption (31) to (34) can be restated as $$v^2 = \frac{V_+}{4}\left(1 + \sqrt{1 - P^2 - \left(\frac{P}{a}\right)^2}\right), \quad (40)$$

$$v = \pm 1/2 \sqrt{V_+\left(1 + \sqrt{1 - P^2 - \left(\frac{P}{a}\right)^2}\right)}, \quad (41)$$

$$\tan\delta_{ex} = \frac{\frac{P}{a}}{1 + \sqrt{1 - P^2 - \left(\frac{P}{a}\right)^2}} \quad (42)$$

and $$\delta_{ex} = \arctan\left(\frac{\frac{P}{a}}{1 + \sqrt{1 - P^2 - \left(\frac{P}{a}\right)^2}}\right). \quad (43)$$

The heading rate h can then be derived from (22), (41) and (42) as $$h = \pm \frac{\sqrt{V_+}}{2b} \frac{P}{\sqrt{1 + \sqrt{1 - P^2 - \left(\frac{P}{a}\right)^2}}}. \quad (44)$$

The exact solutions derived above for v, δ and h are rather complicated and, in particular, lead to unwieldy expressions for the derivatives which are needed where the dependence of v and h upon the scalar wheel velocities $v_l$ and $v_r$ are used in a Kalman filter or a least squares or similar evaluation. Working with them in real time situations where processing power and time are limited is therefore often not practicable. There are, however, more tractable approximations which are usually good enough, at least as long as the wheel angles are not too large. For large wheel angles the said approximations can then be appropriately corrected.

A relatively simple approximate solution which is well known per se from geometrical considerations can be developed starting with (20a) and (20b). (20a) can be rewritten as $$v_l = v\sqrt{\frac{1}{\cos^2\delta} + 2a\tan\delta + a^2\tan^2\delta}. \quad (45)$$

The square root can then be expanded, i.e., linearised, about $$\frac{1}{\cos^2\delta}$$

which yields $$v_l = \frac{v}{\cos\delta} + v\cos\delta\, a\tan\delta + O((a\tan\delta)^2). \quad (46)$$

Disregarding the higher order terms, one arrives at $$v_l = \frac{v_{app}}{\cos\delta_{app}} + av_{app}\sin\delta_{app} \quad (47a)$$

$$v_r = \frac{v_{app}}{\cos\delta_{app}} - av_{app}\sin\delta_{app} \quad (47b)$$

where the suffix app signifies 'approximate' and $v_r$ has been derived in a manner entirely analogous to the derivation of $v_l$ above.

From (47a), (47b) follow $$v_l + v_r = \frac{2v_{app}}{\cos\delta_{app}} \quad (48)$$

and $$v_l - v_r = 2av_{app}\sin\delta_{app}. \quad (49)$$

Defining $$p = \frac{v_l - v_r}{v_l + v_r} \quad (50)$$

one has $$p = a\sin\delta_{app}\cos\delta_{app} = \frac{a}{2}\sin 2\delta_{app} \quad (51)$$

or $$\delta_{app} = 1/2\arcsin\frac{2p}{a} = 1/2\arcsin\frac{2l(v_l - v_r)}{b(v_l + v_r)}. \quad (52)$$

With $\delta_{app}$ one can now extract from (48) the approximate solution $$v_{app} = \frac{v_l + v_r}{2}\cos\delta_{app} \quad (53)$$

and, with (22), from (49)

$$h_{app} = \frac{v_l - v_r}{2b\cos\delta_{app}}. \quad (54)$$

Using (22) one can rewrite equations (47a), (47b) as $$v_l = \frac{v_{app}}{\cos\delta_{app}} + bh_{app}\cos\delta_{app} \quad (55a)$$

$$v_r = \frac{v_{app}}{\cos\delta_{app}} - bh_{app}\cos\delta_{app} \quad (55b)$$

whence (53) and (54) can also be easily derived.

This approximate solution is usually good enough as long as the wheel angles are not too large, i.e., $\delta_{app} < \delta_{thr}$, where $\delta_{thr}$ is a threshold wheel angle which depends on the geometry of the vehicle and the precision requirements and will usually be between 30° and 40°. Where $\delta_{app}$ is larger than $\delta_{thr}$, in particular, if $\delta_{app}$ approaches 45°, the approximate solution tends to deviate significantly, yielding often unsatisfactory results. However, it has been found that the approximation can be improved to an extent which makes it adequate for most practical purposes by replacing $\delta_{app}$ by $\delta_{ex}$ for large values of $\delta_{app}$ in (53) and (54). This yields results intermediate between the exact results according to (41), (44) and the approximate results according to (53), (54) above which are, however quite close to the former even for large wheel angles:

$$v_{im} = \frac{v_l + v_r}{2}\cos\delta_{ex} \quad (56)$$

$$h_{im} = \frac{v_l - v_r}{2b\cos\delta_{ex}}. \quad (57)$$

The approximate and intermediate results for the velocity v and the heading rate h differ only by the choice made for a calculation wheel angle $\delta_{cal}$ used in the calculations which in the first case equals $\delta_{app}$ and in the second $\delta_{ex}$.

$\delta_{ex}$ can be calculated directly from $\delta_{app}$ as follows:

With $$P = \frac{v_l^2 - v_r^2}{v_l^2 + v_r^2} = \frac{(v_l + v_r)(v_l - v_r)}{\frac{1}{2}[(v_l + v_r)^2 + (v_l - v_r)^2]} \quad (58)$$

one gets $$\frac{1}{P} = 1/2\left(\frac{v_l + v_r}{v_l - v_r} + \frac{v_l - v_r}{v_l + v_r}\right) = 1/2\left(\frac{1}{p} + p\right) = \frac{1 + p^2}{2p},$$

i.e., $$P = \frac{2p}{1 + p^2} \quad (59)$$

which, together with (42), leads to $$\tan\delta_{ex} = \frac{\frac{2p}{a}}{1 + p^2 + \sqrt{(1-p^2)^2 - \left(\frac{2p}{a}\right)^2}} \quad (60)$$

and $$\delta_{ex} = \arctan\left(\frac{\frac{2p}{a}}{1 + p^2 + \sqrt{(1-p^2)^2 - \left(\frac{2p}{a}\right)^2}}\right). \quad (61)$$

Taken together with (51), (61) yields $\delta_{ex}$ as a function of $\delta_{app}$.

The reverse, i.e., calculation of $\delta_{app}$ as a function of $\delta_{ex}$, is equally possible. From (20a), (20b) follows $$p = \frac{\sqrt{1 + 2a\tan\delta_{ex} + (1 + a^2)\tan^2\delta_{ex}} - \sqrt{1 - 2a\tan\delta_{ex} + (1 + a^2)\tan^2\delta_{ex}}}{\sqrt{1 + 2a\tan\delta_{ex} + (1 + a^2)\tan^2\delta_{ex}} + \sqrt{1 - 2a\tan\delta_{ex} + (1 + a^2)\tan^2\delta_{ex}}} \quad (62)$$

and this can be used, together with (52), to calculate $\delta_{app}$ from $\delta_{ex}$. In any case, only the fixed parameter a which depends on the geometry of the vehicle enters into the calculations.

Figure 2:
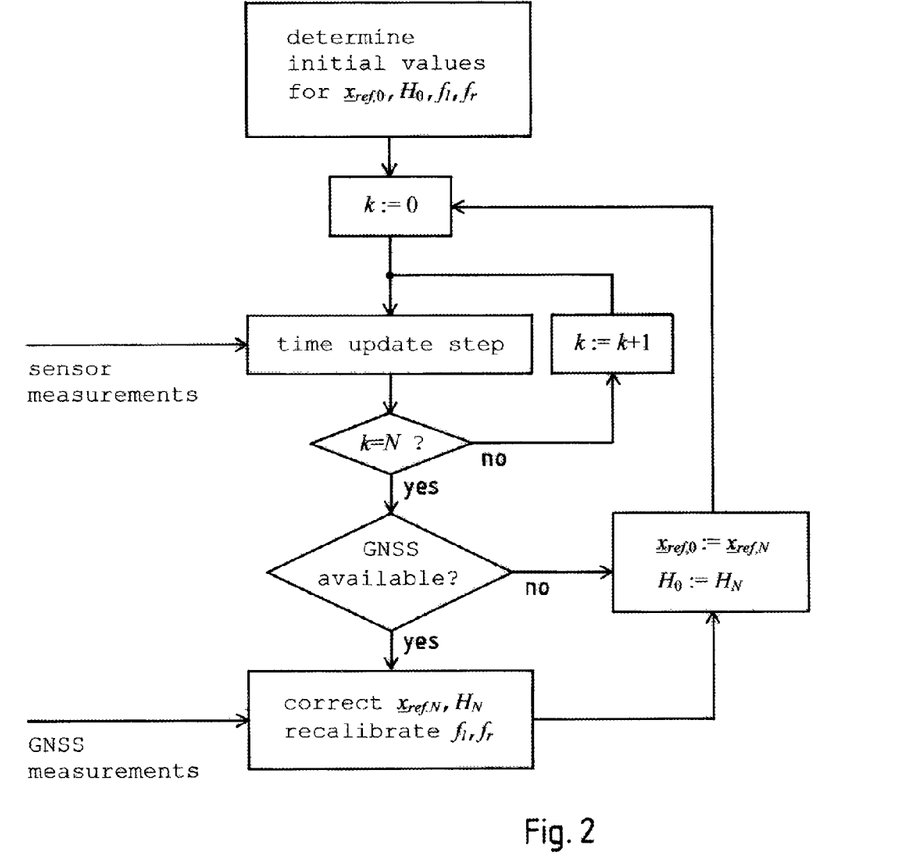
FIG. 2 shows a flow diagram of the method according to the invention.

The method according to the invention can be best understood considering FIG. 2 which provides an overview. For tracking the position of the vehicle, consecutive filter cycles are carried out in the tracking device 4, each covering a cycle interval. A complete filter cycle of the tightly coupled Kalman filter which is preferably used comprises a prediction step and, where GNSS measurements are available, a correction step which also takes those measurements into account. The use of a Kalman filter makes it possible to deal adequately with the random influences which usually affect measurements.

A prediction step consists of N time update steps each covering a measuring interval $\Delta t$ of, e.g., 0.1 s, with N being, e.g., 10, and consequently covers a cycle interval $N\Delta t$ which, in the example, has a duration of 1 s. At the beginning of a prediction step the state vector of the vehicle is set to the values determined at the end of the previous cycle interval, or, at the beginning of the process, to some initial values, which provides a starting point comprising starting values $\underline{x}_{ref,0}$, $H_0$ for the position and the heading as well as values for the wheel tick calibration factors $f_l$, $f_r$.

Figure 3:
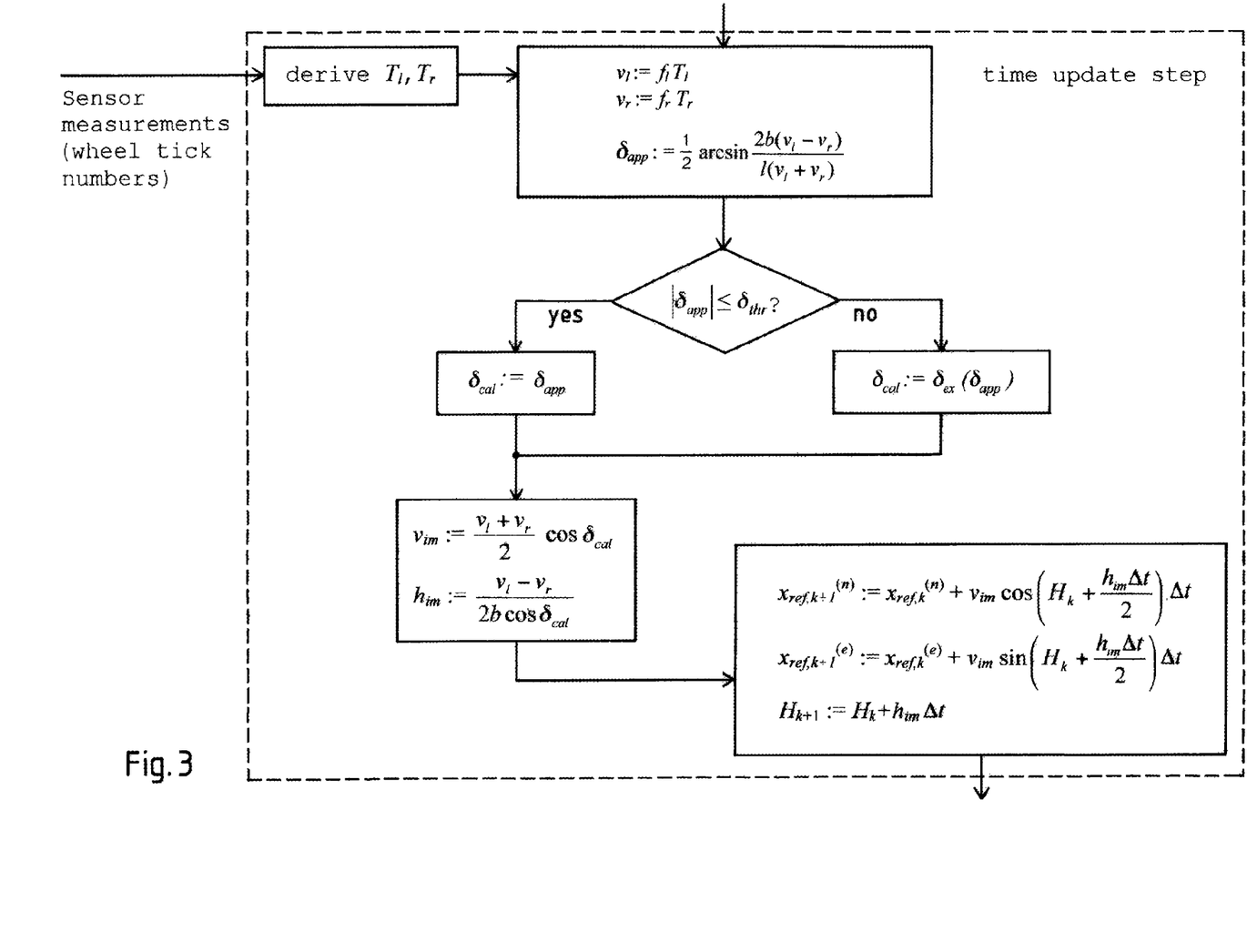
FIG. 3 shows a part of the flow diagram of FIG. 2 in more detail.

During a time update step the following actions are carried out (s. FIG. 3) in the tracking device 4:

A raw velocity $T_l$ of the left front wheel 3a and a raw velocity $T_r$ of the right front wheel 3b are derived from the wheel tick numbers as registered by the wheel tick units 5a;b for each of the N time update intervals, the numbers being low pass filtered for smoothing out random variations.

Wheel velocities $v_l$, $v_r$ are calculated from the raw wheel velocities $T_l$, $T_r$ assigned to the first measurement interval and from the wheel tick calibration factors $f_l$, $f_r$ which are assumed to be constant throughout the cycle interval using equations (4a), (4b), and new values for the position $\underline{x}_{ref,1}$ and heading $H_1$ are determined where equations (1)-(3) with k=0 are used with the calculation wheel angle $\delta_{cal}$ having been determined first from the wheel velocities $v_l$, $v_r$ and used to calculate a velocity v and a heading rate h.

k is then (FIG. 2) replaced by k+1 and the process repeated with the end position from the previous measurement interval used as a starting point in each case until k=N when the process is terminated after the calculation of a new state. In this way the trajectory covered by the vehicle during the cycle interval is approximated by a sequence of N linear sections each corresponding to a time update step. The calculation wheel angle $\delta_{cal}$ is assumed to be a constant at every time update step but the covariance matrix is modified to add process noise accounting for the random factors which in fact influence the value of the said angle used in the calculation.

The result of the prediction step, i.e., of the $N^{th}$ update step, consisting of state and accuracy information, is, where GNSS measurements are available, then used in a correction step of the tightly coupled Kalman filter which also processes the said GNSS measurements. The filter cycle is finalised and a new state vector determined which comprises a corrected position $\underline{x}_{ref,N}$ and heading $H_N$ to be used as a starting point $\underline{x}_{ref,0}$, $H_0$ in the first time update step of the prediction step in the next filter cycle as well as recalibrated wheel tick calibration factors $f_l$, $f_r$. The position and heading are output by the tracking device 4 for display or other purposes, e.g., for use in processing in a navigation device.

Use of equations (1)-(3) above requires that for every time update interval values for v and h are calculated previously which in turn requires determining the calculation wheel angle $\delta_{cal}$ such that v and h can then be calculated as $$v_{im} = \frac{v_l + v_r}{2}\cos\delta_{cal} \quad (63)$$

$$h_{im} = \frac{v_l - v_r}{2b\cos\delta_{cal}} \quad (64)$$

within a wheel angle interval to which the wheel angle $\delta$ is limited and which is usually symmetric about 0°, i.e., equals $[-\delta_{max}, +\delta_{max}]$ where $\delta_{max}$ is some constant depending on mechanical properties of the vehicle and can, e.g., be somewhere between 35° and 42°. In any case it is assumed that $\delta_{max}$ is not greater than $\delta_{lim}$.

For the purpose of calculating v and h equation (52) is used in each case to determine $\delta_{app}$ first. Where $\delta_{app}$ is not too large, e.g., $|\delta_{app}| \leq \delta_{thr}$ where $\delta_{thr}$ is a threshold fixed in such a way that for $|\delta_{app}| \leq \delta_{thr}$ $\delta_{app}$ is within a tolerance range surrounding $\delta_{ex}$, $\delta_{cal}$ is set equal to $\delta_{app}$. The tolerance range is determined by the consideration that any angle within the same is close enough to $\delta_{ex}$ to insure that the error introduced by using it in stead of $\delta_{ex}$ is not significant. In the portion of the wheel angle interval where $\delta_{app}$ is not within the said tolerance range, in the example in the area defined by $|\delta_{app}| > \delta_{thr}$, an approximation to $\delta_{ex}$ is used which deviates less from the same than $\delta_{app}$, preferably a value for $\delta_{cal}$ which is virtually equal to $\delta_{ex}$. That is, $\delta_{cal}$ can be determined according to $$\delta_{cal} = \begin{cases} \delta_{app} & \text{for } |\delta_{app}| \leq \delta_{thr} \\ \delta_{ex} & \text{for } |\delta_{app}| > \delta_{thr} \end{cases} \quad (65)$$

The value of $\delta_{cal}$ from (65) can then be used in (63), (64). The tolerance range about $\delta_{ex}$ can be defined, for instance, by a certain amount or percentage of acceptable deviation, e.g., deviation by not more than 2°, preferably by not more than 1°. Other criteria, e.g., a maximum acceptable deviation of the velocity v or the heading rate h or both, in absolute or relative terms, are also possible.

Figure 4:
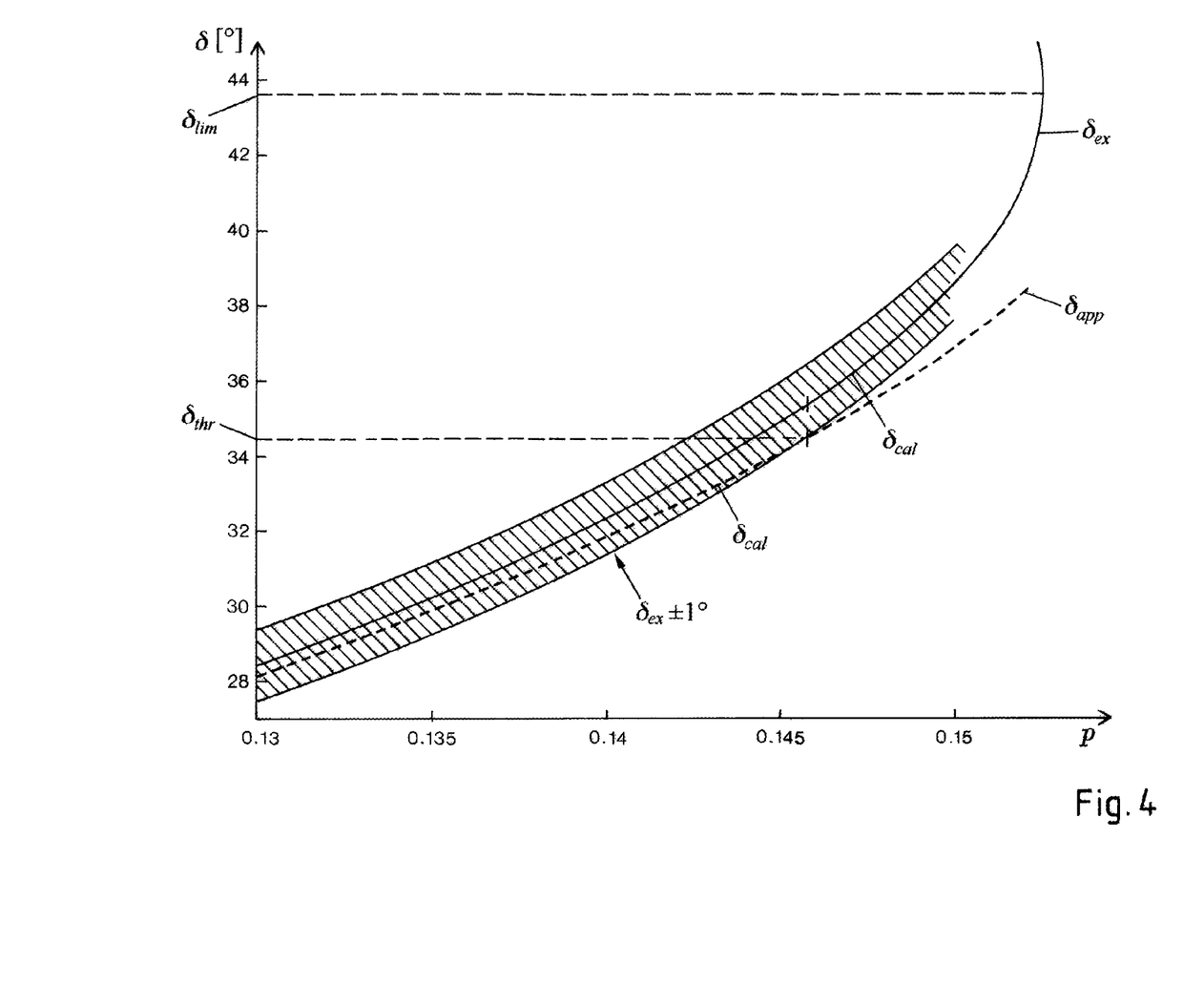
FIG. 4 shows a diagram with an approximate solution and an exact solution for an intermediate wheel angle $\delta$ as shown in FIG. 1.

FIG. 4 shows the situation for a=0.31 with an acceptable deviation of ±1°. Where $\delta_{app}$ is within the tolerance range of $\delta_{ex} \pm 1°$ $\delta_{cal}$ is set equal to $\delta_{app}$. At $\delta_{app} = \delta_{thr}$ where $\delta_{app}$ reaches the boundary of the tolerance range, $\delta_{cal}$ is switched to $\delta_{ex}$.

The most convenient way to replace $\delta_{app}$ by a closer approximation to $\delta_{ex}$ if $|\delta_{app}| > \delta_{thr}$ is to use a look-up table which, for each one of a row of appropriately spaced values of $\delta_{ex}$, contains a corresponding value for $\delta_{app}$ such that the values of $\delta_{app}$ cover an interval bounded below by $\delta_{thr}$ and above by the value of $\delta_{app}$ which corresponds to $\delta_{ex}$ when the latter is equal to $\delta_{max}$. An appropriate table can be calculated once for all for a given vehicle using formulae (52) and (62) and permanently stored. For any value of $\delta_{app}$ with $|\delta_{app}| > \delta_{thr}$ the corresponding value of $\delta_{ex}$ can then be determined by, e.g., linear, interpolation between neighbouring values read from the table. This method does not require much processing power in the tracking device 4 and memory requirements are also modest.

It is also possible, however, to use a function of the δ's whose values differ from δ itself, i.e., a function which differs from the identical function.

E.g., from (51) an expression for $\tan \delta_{app}$ can be derived. Expressing p as $$p = \frac{a \tan \delta_{app}}{1 + \tan^2 \delta_{app}} \tag{66}$$

leads to a quadratic equation for $\tan \delta_{app}$ with the solution $$\tan \delta_{app} = \frac{1 - \sqrt{1 - \left(\frac{2p}{a}\right)^2}}{\frac{2p}{a}} \tag{67}$$

which yields, together with (62), $\tan \delta_{app}$ as a function of $\tan \delta_{ex}$. In a neighbourhood of zero where this function of p is indefinite it can be replaced by the linear approximation $$\tan \delta_{app} = \frac{p}{a}. \tag{68}$$

Again, $\tan \delta_{ex}$ can vice versa be expressed as a function of $\tan \delta_{app}$ inserting p from (66) into (60). These relations can be used to calculate and permanently store a look-up table containing values for $\tan \delta_{ex}$ as a function of $\tan \delta_{app}$.

A $\tan \delta_{cal}$ can then be used in the calculations which is defined as $$\tan \delta_{cal} = \begin{cases} \tan \delta_{app} & \text{for } |\delta_{app}| \leq \delta_{thr} \\ \tan \delta_{ex} & \text{for } |\delta_{app}| > \delta_{thr} \end{cases} \tag{69}$$

or equivalently $$\tan \delta_{cal} = \begin{cases} \tan \delta_{app} & \text{for } |\tan \delta_{app}| \leq \tan \delta_{thr} \\ \tan \delta_{ex} & \text{for } |\tan \delta_{app}| > \tan \delta_{thr}. \end{cases} \tag{70}$$

$\cos \delta_{cal}$ can then be expressed as a function of $\tan \delta_{cal}$, as $$\cos \delta_{cal} = \frac{1}{\sqrt{1 + \tan^2 \delta_{cal}}}, \tag{71}$$

for calculating $v_{im}$ and $-h_{im}$ according to (63) and (64), respectively.

Where (63) and (64) are used it is, however, more convenient to work directly with the cosine. An expression for $\cos \delta_{app}$ can be derived from (51) as follows:

$$p = a\sqrt{1 - \cos^2 \delta_{app}} \cos \delta_{app} \tag{72}$$

leads to a quadratic equation for $\cos^2 \delta_{app}$ $$\cos^4 \delta_{app} - \cos^2 \delta_{app} + \left(\frac{p}{a}\right)^2 = 0 \tag{73}$$

with the solution $$\cos \delta_{app} = \sqrt{\frac{1 + \sqrt{1 - \left(\frac{2p}{a}\right)^2}}{2}}. \tag{74}$$

for the cosine. Here again, $\cos \delta_{ex}$ can be expressed as a function of $\cos \delta_{app}$, e.g., via the tangent with $$\tan \delta_{app} = \frac{\sqrt{1 - \cos^2 \delta_{app}}}{\cos \delta_{app}} \text{ and } \cos \delta_{ex} = \frac{1}{\sqrt{1 + \tan^2 \delta_{ex}}}$$

and vice versa. This can be used to prepare a look-up table with corresponding pairs of $\cos \delta_{app}$ and $\cos \delta_{ex}$ from which $\cos \delta_{cal}$ can be easily determined for $|\delta_{app}| > \delta_{thr}$ or, equivalently, $|\cos \delta_{app}| < \cos \delta_{thr}$.

A somewhat different $v_{im}$ can be calculated from $\tan \delta_{ex}$ using $$v_{im} = \pm 1/2 \sqrt{\frac{V_+ \frac{p}{a}}{\tan \delta_{ex}}} = \pm \frac{1}{\sqrt{2a}} \sqrt{\frac{V_+ p}{(1 + p^2) \tan \delta_{ex}}} \tag{75}$$

or equivalently $$v_{im} = \pm \frac{1}{2\sqrt{a}} \sqrt{\frac{V_-}{\tan \delta_{ex}}} \tag{76}$$

$$= \pm \frac{1}{2\sqrt{a}} \sqrt{\frac{v_l^2 - v_r^2}{\tan \delta_{ex}}}$$

$$= \pm \frac{1}{2\sqrt{a}} \sqrt{\frac{(v_l + v_r)(v_l - v_r)}{\tan \delta_{ex}}}$$

which can be easily derived from (41), (42) and yields the exact solution of equations (20a), (20b) for v. (75) or (76) can, in particular, be employed where $\tan \delta_{ex}$ is rather large, e.g., where $\delta_{app} > \delta_{thr}$, whereas (63) is used for smaller $\delta_{app}$. But it is also possible to use the said formulae over the whole range, i.e., with $\tan \delta_{cal}$.

$h_{im}$, on the other hand, can also be derived from $v_{im}$—whether calculated according to (63) or according to (75) or (76)—and $\tan \delta_{ex}$ using (22), i.e., $$h_{im} = \frac{v_{im} \tan \delta_{ex}}{l}, \tag{77}$$

which, if $v_{im}$ is calculated using (75) or (76), corresponds to $$h_{im} = \pm \frac{1}{2l}\sqrt{V_+ \frac{P}{a}\tan\delta_{ex}} = \pm \frac{1}{\sqrt{2bl}}\sqrt{V_+ \frac{P}{1+p^2}\tan\delta_{ex}} \quad (78)$$

or, equivalently, to $$h_{im} = \pm \frac{1}{2\sqrt{bl}}\sqrt{V_-\tan\delta_{ex}} = \pm \frac{1}{2\sqrt{bl}}\sqrt{(v_l+v_r)(v_l-v_r)\tan\delta_{ex}} \quad (79)$$

which is equivalent to h as calculated according to (44), i.e., the exact solution resulting from equations (20a), (20b). Here again, (77) can be used only where $\delta_{app} > \delta_{thr}$ or over the whole range, with tab $\delta_{cal}$.

Use of the intermediate values $v_{im}$ and $h_{im}$ as calculated according to the simple formulae (63) and (64) has been found to be adequate in most cases even where the calculation wheel angle $\delta_{cal}$ varies over an interval of [−35°, +35°] or more.

If sufficient processing capacity is available, it is also possible to use formulae (52) and (61) in order to calculate $\delta_{ex}$ directly from $\delta_{app}$ or formulae (66) and (60) to calculate tan $\delta_{ex}$ directly from tan $\delta_{app}$ in stead of using a look-up table or even to use formulae (41) and (44) which yield, together with (23), (24) and (30), a velocity v and heading rate h which are exact solutions of equations (20a) and (20b), corresponding to solutions where $\delta_{ex}$ is used for the wheel angle and (75) or (76) and (77) for v and h, respectively.

In the Kalman filter correction step which follows the prediction step to finalise the filter cycle, apart from GNSS observation equations, observation equations expressing the raw wheel velocities $T_l$, $T_r$ as functions of the states v, h, $f_l$ and $f_r$ are used where $\delta_{cal}$ figures as a parameter. E.g., equations $$T_l = \frac{1}{f_l}\left(\frac{v}{\cos\delta_{cal}} + bh\cos\delta_{cal}\right) \quad (80a)$$

$$T_r = \frac{1}{f_r}\left(\frac{v}{\cos\delta_{cal}} - bh\cos\delta_{cal}\right) \quad (80b)$$

are employed which correspond to (55a), (55b) with $v_l$, $v_r$ expressed according to (4a), (4b), respectively, and $\delta_{app}$ replaced by $\delta_{cal}$. $T_l$ and $T_r$ are treated as observations and $f_l$, $f_r$, v and h as unknowns.

FIG. 5 is a block diagram illustrating one embodiment of the tracking device 4. The tracking device 4 comprises an interface 7, a processor 8, and a memory 9. The interface 7 is coupled to the wheel tick units 5a, 5b by a plurality of input lines and coupled to the antenna for receiving GNSS signals. The interface 7 is further coupled to the processor 8 and the memory 9 for communicating data and commands therebetween. The interface 7 may also be coupled via a plurality of output lines to a user display (not shown) or other external device to provide to a user or other device the result of the processing described herein. The processor 8 and the memory 9 may also be coupled together. The processor 8 performs the processing, calculating, deriving and the like described above for the tracking device 4 and equations (1) through (80a, 80b).

The memory 9 may function as a data storage system and as a cache memory for processing. The memory 9 includes a look-up table 10 that stores the look-up tables described above.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, FLASH, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for tracking a position and a heading of a vehicle, at least intermittently using dead reckoning tracking based on velocities of left and right front wheels, the method comprising:

receiving, by using a processor, measurement parameters indicative of a velocity $v_l$ of the left front wheel and measurement parameters indicative of a velocity $v_r$ of the right front wheel, deriving, by using the processor, a value for the velocity $v_l$ of the left front wheel from the parameters indicative of a velocity $v_l$ of the left front wheel and a value of the velocity $v_r$ of the right front wheel from the parameters indicative of a velocity $v_r$ of the right front wheel, calculating, by using the processor, a function of a calculation wheel angle $\delta_{cal}$ from the velocity $v_l$ of the left front wheel and the velocity $v_r$ of the right front wheel, the calculation wheel angle varying over a wheel angle interval, using, by the processor, the function of the calculation wheel angle $\delta_{cal}$ to calculate a velocity v and a heading rate h of the vehicle, where the calculation wheel angle $\delta_{cal}$ reflected in said function deviates at least in a portion of the wheel angle interval, from an exact wheel angle $\delta_{ex}$ calculated according to $$\delta_{ex} = \arctan\left(\frac{\frac{2p}{a}}{1+p^2+\sqrt{(1-p^2)^2-\left(\frac{2p}{a}\right)^2}}\right)$$

by less than an approximate wheel angle defined as $$\delta_{app} = 1/2 \arcsin\frac{2p}{a}$$

deviates from the same, where a is one half of the front track gauge divided by the wheel base and $$p = \frac{v_l - v_r}{v_l + v_r},$$

calculating, by using the processor, values of the position and the heading of the vehicle based on a previous position and heading of the vehicle, using the calculated velocity v and heading rate h of the vehicle.

2. The method according to claim 1, wherein for the whole wheel angle interval, the extent of the deviation of the calculation wheel angle $\delta_{cal}$ from the exact wheel angle $\delta_{ex}$ is smaller than 2°.

3. The method according to claim 1, further comprising calculating a function of an approximate wheel angle $\delta_{app}$, and, if the approximate wheel angle $\delta_{app}$ is smaller than a threshold wheel angle, the function of the wheel angle used in the calculation of the heading rate h reflects that the calculation wheel angle $\delta_{cal}$ equals the approximate wheel angle $\delta_{app}$ whereas, if the approximate wheel angle $\delta_{app}$ is greater than the threshold wheel angle, the function reflects that the calculation wheel angle $\delta_{cal}$ differs from the approximate wheel angle $\delta_{app}$ and is determined from the function of the latter.

4. The method according to claim 3, where for the determination of the function of the calculation wheel angle $\delta_{cal}$ from the function of the approximate wheel angle $-\delta_{app}$ a look-up table is used where pairs consisting of the value of the function of the exact wheel angle $\delta_{ex}$ and the function of the corresponding value of the approximate wheel angle $\delta_{app}$ are stored.

5. The method according to claim 4, further comprising calculating, using interpolation, the value of the function of the exact wheel angle $\delta_{ex}$, where the value of the function of the approximate wheel angle $\delta_{app}$ falls between two values of the same stored in the look-up table.

6. The method according to claim 1, wherein the velocity v of the vehicle is calculated as $$v = \frac{v_l + v_r}{2}\cos\delta_{cal}.$$

7. The method according to claim 1, wherein the velocity v of the vehicle is calculated as $$v = \frac{1}{2\sqrt{a}}\sqrt{\frac{v_l^2 - v_r^2}{\tan\delta_{cal}}}.$$

8. The method according to claim 1, wherein the heading rate h is calculated as $$h = \frac{v\tan\delta_{cal}}{l}$$

where l is the wheel base.

9. The method according to claim 1, wherein the heading rate h of the vehicle is calculated as $$h = \frac{v_l - v_r}{2b\cos\delta_{cal}}$$

where b is one half of the front track gauge.

10. The method according to claim 1, wherein the calculation wheel angle $\delta_{cal}$ varies over a range comprising the interval [−35°, 35°].

11. The method according to claim 1, further comprising filtering in consecutive filter cycles, wherein each filter cycle comprises a prediction step consisting of at least one time update step where in each case the values of the position and of the heading of the vehicle are calculated from the velocity v and the heading rate h, each calculation being based on a previously established value of the position and the heading, and, if Global Navigation Satellite System measurements are available, a correction step where the values of the position and the heading calculated in the prediction step are corrected with the Global Navigation Satellite System measurements being taken into account.

12. The method according to claim 11, wherein every prediction step comprises a fixed number of consecutive time update steps.

13. The method according to claim 11, wherein at each correction step wheel calibration factors which are used to determine the velocity $v_l$ of the left front wheel and the velocity $v_r$ of the right front wheel from raw wheel velocities which are based on measured wheel tick numbers are recalibrated.

14. A tracking device usable in a vehicle, comprising:
a plurality of input lines for receiving data from wheel tick units;
a plurality of output lines for providing at least a reference position;
a data storage system;
a processor coupled to the plurality of input lines, the plurality of output lines, and the data storage system and configured to
receive sensor measurements indicative of the velocity $v_l$ of a left front wheel and sensor measurements indicative of the velocity $v_r$ of a right front wheel,
derive a value for the velocity $v_l$ of the left front wheel from the sensor measurements indicative of a velocity $v_l$ of the left front wheel and a value of the velocity $v_r$ of the right front wheel from the sensor measurements indicative of a velocity $v_r$ of the right front wheel,
calculate a function of a calculation wheel angle $\delta_{cal}$ from the velocity $v_l$ of the left front wheel and the velocity $v_r$ of the right front wheel, the calculation wheel angle $\delta_{cal}$ varying over a wheel angle interval,
use the function of the calculation wheel angle $\delta_{cal}$ to calculate a velocity v and a heading rate h of the vehicle, where the calculation wheel angle $\delta_{cal}$ which is reflected in said deviates, at least in a portion of the wheel angle interval, from an exact wheel angle $\delta_{ex}$ calculated according to $$\delta_{ex} = \arctan\left(\frac{\frac{2p}{a}}{1 + p^2 + \sqrt{(1-p^2)^2 - \left(\frac{2p}{a}\right)^2}}\right)$$

by less than an approximate wheel angle defined as $$\delta_{app} = 1/2 \arcsin\frac{2p}{a}$$

deviates from the same, where a is one half of the front track gauge divided by the wheel base and $$p = \frac{v_l - v_r}{v_l + v_r},$$

calculate values of a position and a heading of the vehicle based on a previous position and heading of the vehicle, using the calculated velocity v and heading rate h of the vehicle.

15. The tracking device according to claim 14, wherein for the whole wheel angle interval, the extent of the deviation of the calculation wheel angle $\delta_{cal}$ from the exact wheel angle $\delta_{ex}$ is smaller than 2°.

16. The tracking device according to claim 14, wherein the processor is further configured to calculate a function of the approximate wheel angle $\delta_{app}$ and, if the approximate wheel angle $\delta_{app}$ is smaller than a threshold wheel angle, to use the function of the wheel angle in the calculation of the heading rate h which reflects that the calculation wheel angle $\delta_{cal}$ equals the approximate wheel angle $\delta_{app}$ whereas, if the approximate wheel angle $\delta_{app}$ is greater than the threshold wheel angle, the function reflects that the calculation wheel angle $\delta_{cal}$ differs from the approximate wheel angle $\delta_{app}$ and is determined from the function of the latter.

17. The tracking device according to claim 16, wherein the processor is further configured to use, for the determination of the function of the calculation wheel angle $\delta_{cal}$ from the function of the approximate wheel angle $\delta_{app}$, a look-up table where pairs consisting of the value of the function of the exact wheel angle $\delta_{ex}$ and the function of the corresponding value of the approximate wheel angle $\delta_{app}$ are stored.

18. The tracking device according to claim 17, wherein the processor is further configured to calculate, using interpolation, the value of the function of the exact wheel angle $\delta_{ex}$, where the value of the function of the approximate wheel angle $\delta_{app}$ falls between two values of the same stored in the look-up table.

19. The tracking device according to claim 14, having at least one further input line for receiving a signal from a Global Navigation Satellite System antenna, the processor being configured to carry out consecutive filter cycles, wherein each filter cycle comprises a prediction step consisting of at least one time update step where in each case the values of the position and the heading of the vehicle are calculated from the velocity v and the heading rate h, each calculation being based on a previously established value of the position and the heading, and, if Global Navigation Satellite System measurements can be derived from the signal received from the Global Navigation Satellite System antenna, a correction step where the values of the position and the heading calculated in the prediction step are corrected with the Global Navigation Satellite System measurements being taken into account.

* * * * *